July 15, 1969  W. A. EDWARDS  3,455,277
ANIMAL COMMODE
Filed April 26, 1967
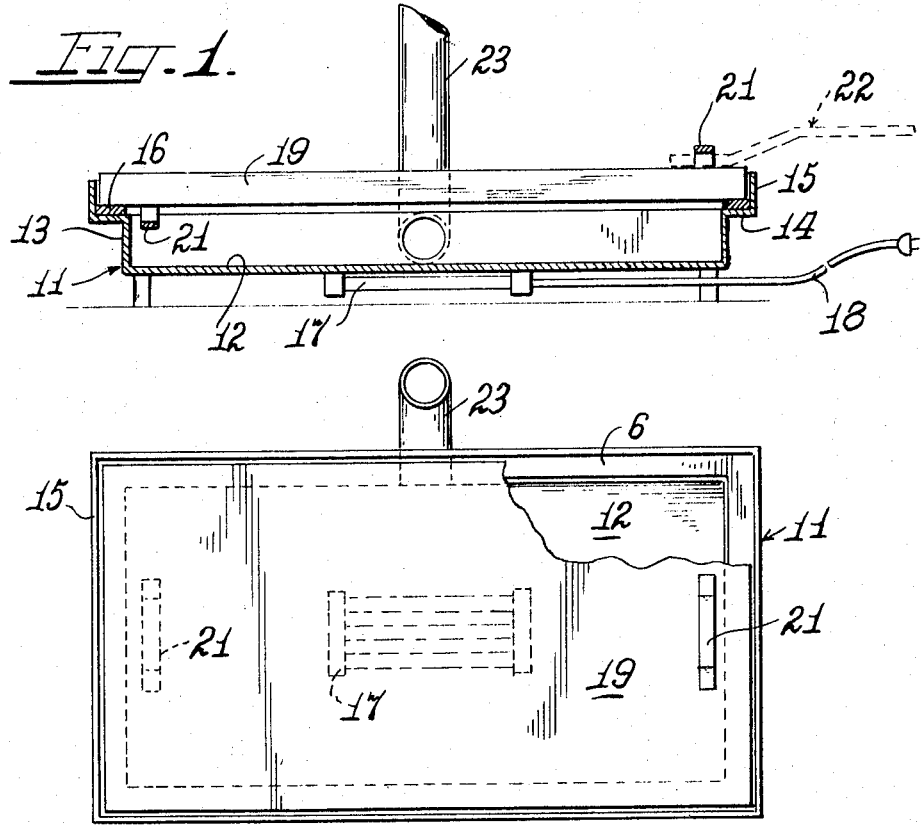
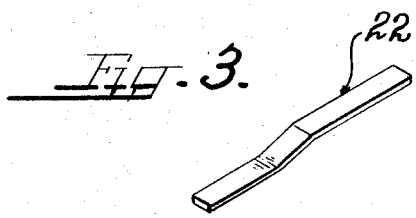
INVENTOR.
William A. Edwards
BY
Charles H. Redman
Atty.

United States Patent Office 3,455,277
Patented July 15, 1969

1

3,455,277
ANIMAL COMMODE
William A. Edwards, 401 Saddler Ave.,
Elgin, Ill. 60120
Filed Apr. 26, 1967, Ser. No. 633,738
Int. Cl. A01k 23/00
U.S. Cl. 119—1   4 Claims

ABSTRACT OF THE DISCLOSURE

An animal commode having a shallow pan covered by a platform that can be turned over to deposit excrement from the platform into the pan, and having means to heat the pan to dehydrate or dry out the excrement.

---

The invention relates to improvements in animal commodes and is particularly concerned with the construction and assembly of a commode especially useful for installation within a home or other confined area. The commode is characterized by the inclusion of a shallow pan or receptacle having a heater element associated with it. A platform is seated loosely on the pan so that excrement deposited thereon by the animal may be deposited into the pan by simply turning the platform over after use. The excrement thus deposited in the pan will be dehydrated or dried out by the heater means and the dried excrement may be later removed. Vapor and odors are disposed of through a suitable vent.

It is, therefore, an object of the invention to provide a commode of the character referred to.

Another object is to provide, in an animal commode, a reversible platform.

Another object is to provide a novel covered, ventilated excrement compartment and heater means therefor.

Another object is to provide a structure of the character referred to which is not expensive or difficult to manufacture and which is very efficient in use.

The structure by means of which the above noted and other objects and adavntages of the invention are attained will be described in the following specification, taken in conjunction with the accompanying drawings, showing a preferred illustrative embodiment of the invention, in which:

FIG. 1 is a longitudinal sectional view of the animal commode, showing the platform in elevation;

FIG. 2 is a top plan view of the commode, showing a portion of the platform broken away; and, FIG. 3 is a perspective view of the handle.

Referring to the exemplary disclosure of the animal commode shown in the accompanying drawings, the commode comprises a shallow rectangular pan 11 having a bottom wall 12 and perimeter walls 13. The perimeter walls 13 terminate at their upper margins in out-turned flanges 14 and upstanding marginal lips 15. A gasket 16 is seated on the flanges 14 for a purpose to be made apparent hereinafter. A heater element, such as an electric heater 17, is arranged on the bottom side of the bottom wall 12 having the usual cord 18 adapting it to be connected with a source of electrical power. If desired, the burner may be gas, infra-red or any other kind as a substitute for the electric heater shown.

Seated on the gasket 16 is a platform 19 which may comprise a rectangular piece of wood or other sheet material. This platform seats on the gasket 16 within the marginal lips 15 so as to be held against displacement. In use, when an animal deposits excrement onto the top surface of platform 19, said platform is then turned over so as to deposit the excrement into the pan 11. Suitable straps 21 are provided on the platform for easy engagement by a detachable handle 22 to facilitate turning over of the platform.

When the excrement has been deposited in the pan 11, the heater 17 is turned on so as to provide heat for drying out the excrement after which it may be removed from the pan manually and disposed of. A vent pipe 23 is arranged in communication with the pan below the platform which may be extended through a window or connected directly to a chimney. The gasket 16 effectively seals the pan so as to prevent the escape of odor from the pan during the drying process.

Although I have described a preferred embodiment of the invention, in considerable detail, it will be understood that the description thereof is intended to be illustrative, rather than restrictive, as details of the structure disclosed may be modified or changed without departing from the spirit or scope of the invention. Accordingly, I do not desire to be restricted to the exact construction described.

I claim:

1. An animal commode comprising, in combination, a shallow excrement dehydrating pan having an imperforated bottom wall and upstanding perimeter walls, an internal upwardly facing shoulder on said perimeter walls closely adjacent to the top edges thereof, an animal support and excrement reeciving platform top having its perimeter margins seated on said shoulder, means on the platform top adapted to be engaged by a removable handle to remove the platform top for reversing it top for bottom so as to deposit material thereon into the pan, and means suspended from the bottom wall of the pan for heating same.

2. The commode recited in claim 1, in which the pan is ventilated.

3. The commode recited in claim 1, in which a gasket is arranged on the shoulder.

4. The commode recited in claim 1, in which the pan is substantially rectangular.

References Cited

UNITED STATES PATENTS

| | | | |
|---|---|---|---|
| 2,280,779 | 4/1942 | Barragy | 119—33 |
| 2,741,223 | 4/1956 | Winborn | 119—1 |
| 2,851,992 | 9/1956 | Wolf | 119—33 |
| 2,971,493 | 2/1961 | Robb | 19—1 |
| 3,100,474 | 8/1963 | Schneider | 119—1 |
| 3,141,441 | 7/1964 | Russell | 119—1 |
| 3,154,052 | 10/1964 | Sweeney | 119—1 |
| 3,227,138 | 1/1966 | Campbell | 119—1 |
| 3,246,630 | 4/1966 | Dearing et al. | 119—1 |

ALDRICH F. MEDBERY, Primary Examiner